UNITED STATES PATENT OFFICE.

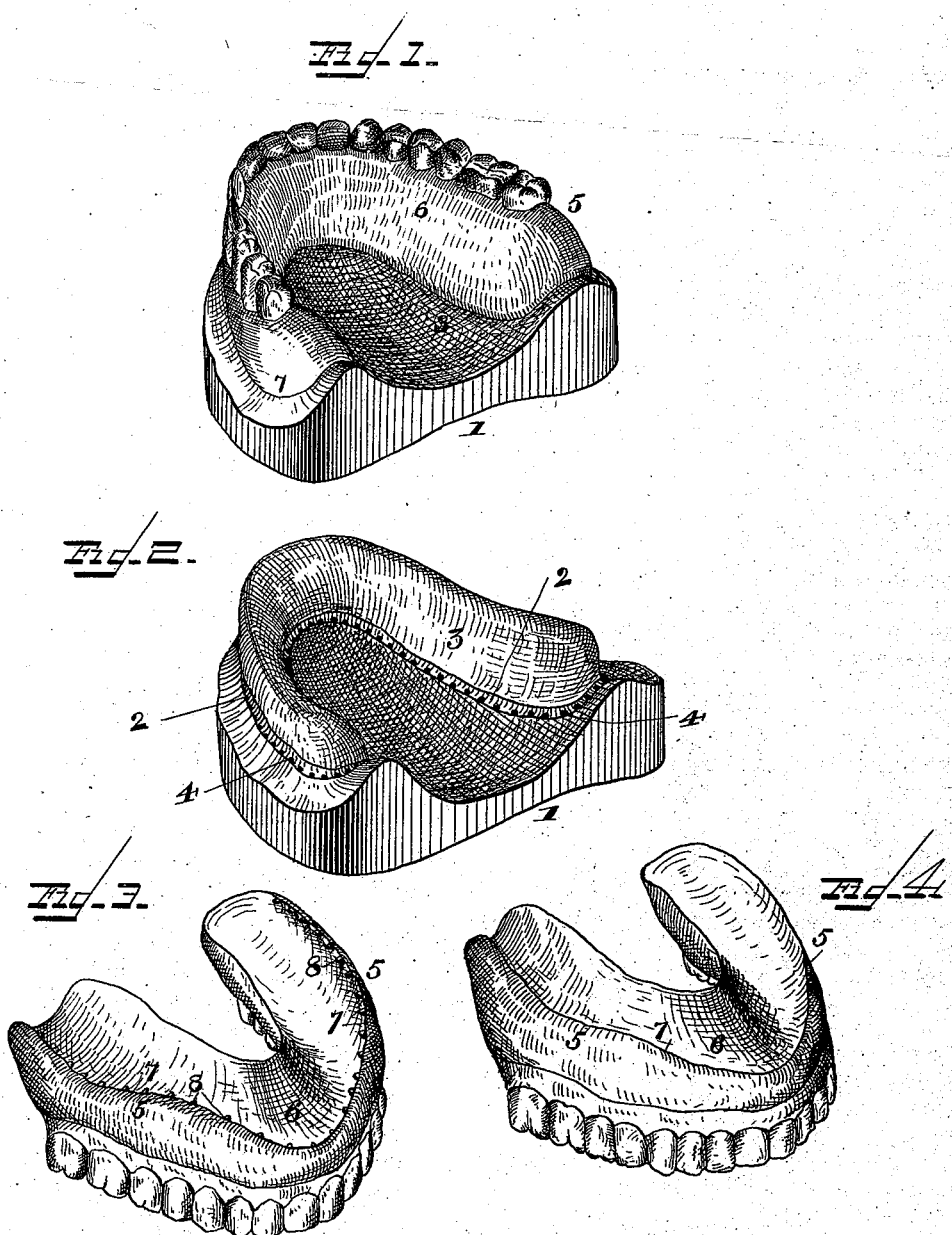

PETER J. MALONE, OF ALTOONA, PENNSYLVANIA.

MODEL FOR DENTAL PLATES.

SPECIFICATION forming part of Letters Patent No. 382,539, dated May 8, 1888.

Application filed January 24, 1888. Serial No. 261,777. (Model.)

*To all whom it may concern:*

Be it known that I, PETER J. MALONE, of Altoona, in the county of Blair and State of Pennsylvania, have invented certain new and useful Improvements in Models for Dental Plates; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved model for dental plates, showing the plate molded upon it. Fig. 2 is a similar view of the model, with the plate removed. Fig. 3 is a similar view of the plate removed from the model and in condition for trimming; and Fig. 4 is a similar view of the trimmed and finished plate.

The same numerals of reference indicate the same or corresponding parts in all the figures.

My invention has relation to models for molding that class of upper dental plates in which the roof portion of the plate is removed or cut out, and in which the edges of the walls of the plate are preferably formed with suitable ridges or flanges for holding against the gums; and it consists in the improved construction of parts of such a model, as hereinafter more fully described and claimed.

In the accompanying drawings, the numeral 1 indicates the model, which is in general shape like any model usually employed in molding dental plates, and having a groove, 2, cut around the gum portions 3 of the model for forming the desired flange or ridge in the plate. In the outer side or edge of this groove are formed, at intervals of about one-sixteenth of an inch to one-eighth of an inch, depressions or holes 4, just of a sufficient depth and size to have the plastic mass of vulcanized rubber depressed into them. After the model has been prepared in this manner, and has had its surface treated in the usual or any desired manner, the plate is molded over the gum portions of the model, the edges of the mass used for the plate being pressed into the groove of the model, so that the mass will enter the depressions or holes in the same. When, now, the plate is modeled and has hardened sufficiently, it is removed from the model, and the walls 5 of the plate 6 will be formed with an inwardly-turned slight flange or ridge, 7, at its edge, and with a row of small points or heads, 8, at the outer side of this ridge or flange. This row of points will indicate at which point the superfluous portions of the plate shall be trimmed off, and after these portions have been trimmed off, using the row of points as a guide, the plate is ready for use with the usual finishing required for all plates.

By reference to Fig. 3 of the drawings, it will readily be seen that the row of points will form a correct guide for the trimming of the plate, so that it will be impossible to make any mistakes in trimming the same and to remove either too much or too little, it being just necessary to remove portions to the row of points and to remove the points when the correct trimming has been made.

Correct trimming is especially necessary and essential in making the style of plates for which this model is principally intended, viz., plates having no roof portion, as it is important to have the walls of the plate fitting perfectly and firmly against the gums, as all the strain and weight of the plate and denture is to be borne by the horseshoe-shaped plate without the aid of the usual suction-disk in the roof of the mouth, and the row of points will be found to form a valuable guide for the trimming in these plates.

It follows that the mold may be made for other shapes of plates with the row of depressions or holes for making guide-points; but I prefer to use the depressions in the form of mold shown and for the form of plates shown and described.

Having thus described my invention, I claim and desire to secure by Letters Patent of the United States—

1. A model for dental plates, having a row of depressions or holes formed in the edge of its molding-surface for molding a guide-row of points or heads, as shown and described.

2. A model for dental plates, having a groove formed in the edge of its molding-surface and formed with a row of depressions or holes in the outer edge or side of the groove for molding a guide-row of points or heads for trimming the plate, as shown and described.

In testimony that I claim the foregoing as my own I have hereunto affixed my signature in presence of two witnesses.

PETER J. MALONE.

Witnesses:
LOUIS BAGGER,
GEO. E. FRECH.